G. M. AND A. W. BARBY.
REAPER THRESHER MACHINE.
APPLICATION FILED MAY 5, 1919.
1,315,455.
Patented Sept. 9, 1919.
4 SHEETS—SHEET 2.
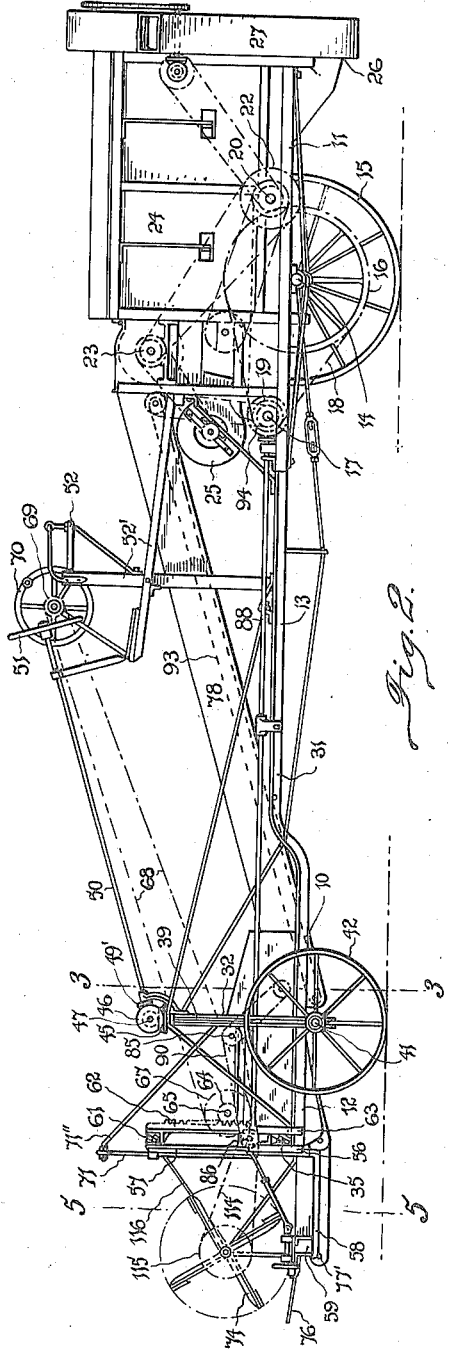
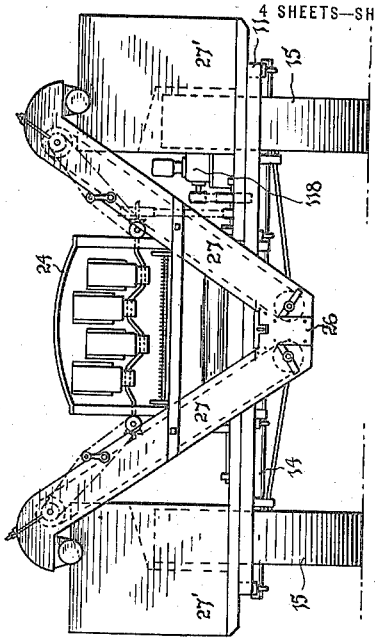
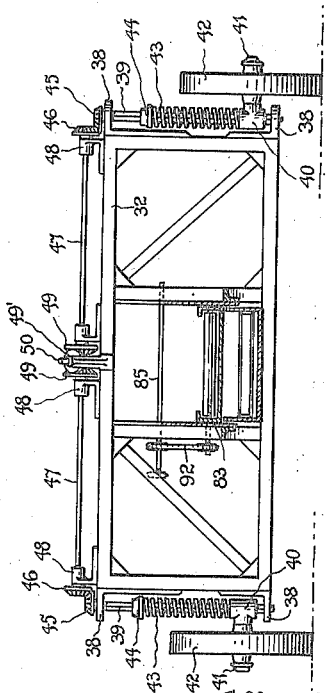
Inventors
G. M. & A. W. BARBY.
By Albert Fowler
Attorney

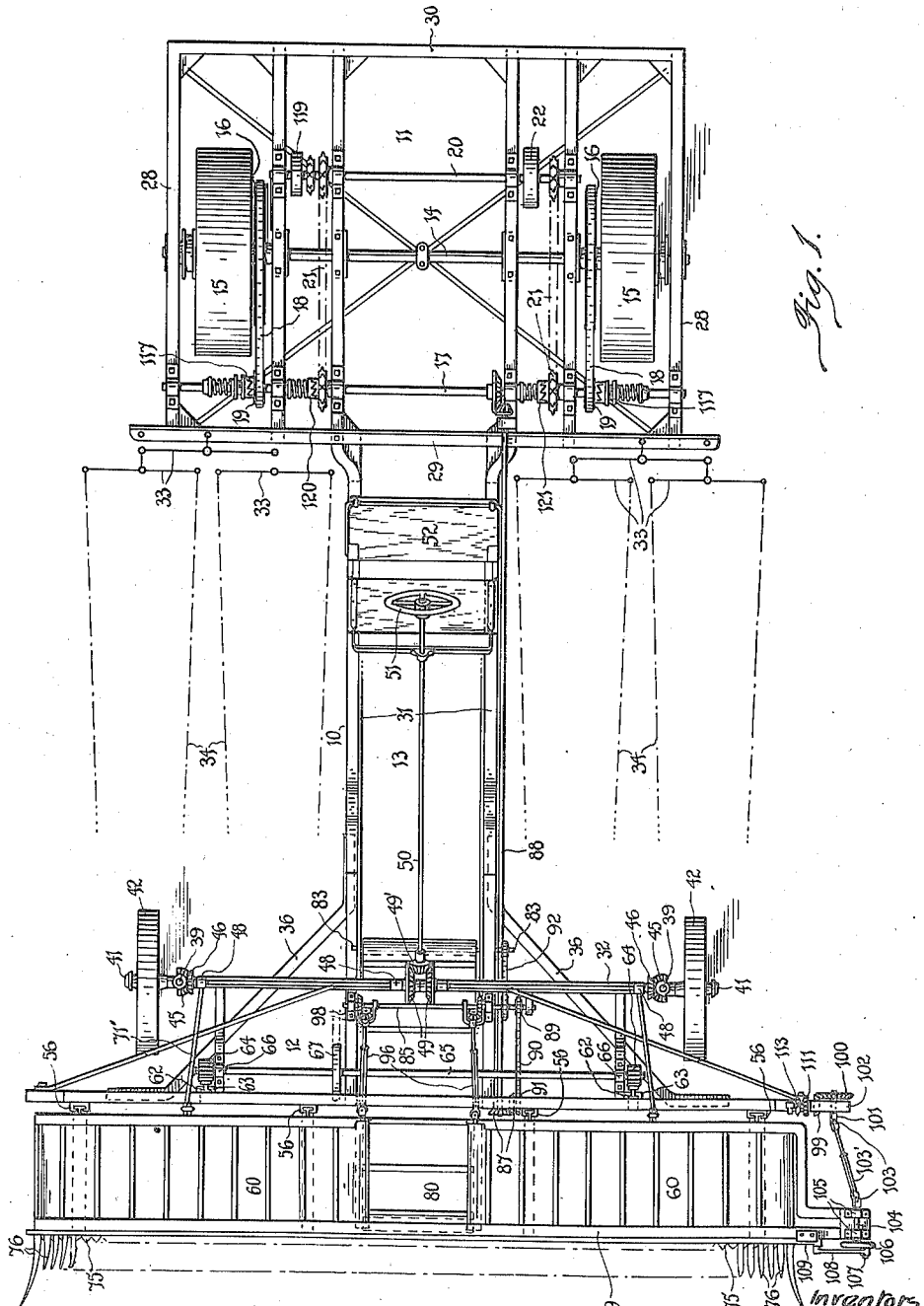

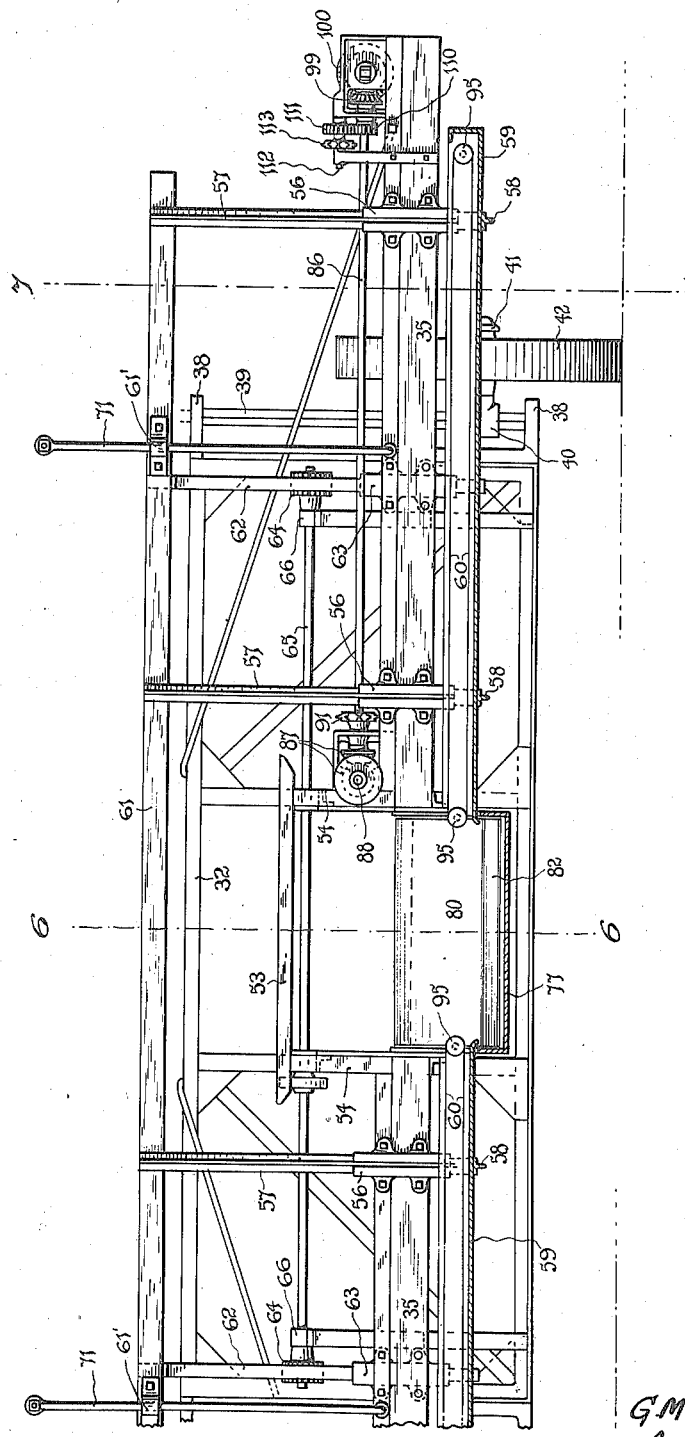

Inventors
G. M. & A. W. Barby

UNITED STATES PATENT OFFICE.

GILBERT MAW BARBY AND ARTHUR WILLIAM BARBY, OF BROADMEADOWS, VICTORIA, AUSTRALIA.

REAPER-THRESHER MACHINE.

1,315,455.  Specification of Letters Patent.  Patented Sept. 9, 1919.

Application filed May 5, 1919. Serial No. 294,979.

*To all whom it may concern:*

Be it known that we, GILBERT MAW BARBY and ARTHUR WILLIAM BARBY, machinery experts, subjects of the King of Great Britain, residing at Pascoe street, Broadmeadows, in the State of Victoria, Commonwealth of Australia, have invented certain new and useful Improvements in Reaper-Thresher Machines, of which the following is a specification.

This invention relates to improvements in reaper thresher machines and refers to reaper-thresher machines of the "push" or straight draft harvester type wherein the draft is located at the rear of the comb and reaping mechanism.

Hitherto it has been the usual custom to construct reaper thresher machines with the draft on one side thereof and in advance of the reaping and conveying mechanism which project laterally from the main frame beyond the crop side of the machine. The disadvantage of this principle of propulsion is that as the motive power is not in alinement with the working strain applied to the reaping and conveying mechanisms the machines have a tendency to slue or run into the crop when designed to take a wide cut and in actual practice the width of the reaping mechanism is limited in order that the side draft will be able to more than counterbalance the lateral strain due to the working stresses set up when the machines are in operation.

In order to overcome the objections incident to the side application of the motive power and to obtain a maximum width of cut it has been proposed to construct a machine with the reaping and conveying mechanisms arranged transversely in advance of the machine and with the draft power in a direct line therebehind and in advance of the threshing and winnowing mechanisms.

In the different types of machines at present in use the reaping mechanism and conveyers operating transversely at the rear thereof are supported on a frame which is pivoted at or near its end whereby it may be raised and lowered to adjust the elevation of the reaping mechanism to suit the height of crop being harvested. The disadvantage of this feature of construction is that the reaping and conveying mechanisms are inclined to the horizontal when at or near the limit of their movements in their raised and lowered positions with the result that they do not operate uniformly under all conditions.

Now this invention relates to that type of reaper thresher machine in which the draft either animal or motive power or both combined—is arranged behind the reaping mechanism and in front of the threshing mechanism, the frame being mounted on two front steering wheels and two rear driving wheels with the reaping mechanism in front of the steering wheels and the threshing mechanism at the rear of the frame.

The object of the present invention is to provide certain improvements in straight draft harvester machines of the class described whereby the reaping and conveying mechanisms are adapted to be raised and lowered in a plane more or less parallel with the ground. The invention moreover, comprises improvements in the main frame for the adaptation of the means for raising and lowering the reaping mechanism, in suspension means for the steering wheels and in means for removing cleaned grain from the winnower and conveying it to grain boxes disposed on both sides of the main frame.

We accomplish the above mentioned object by providing a machine wherein the frame is mounted on two rear transport wheels and two front steering wheels and formed with a narrow central portion upon both sides of which the draft animals are located. The threshing and winnowing mechanism are located on the rear of the frame and the front of the frame in advance of the front or steering wheels is formed with lateral beams or a cross head having vertical or approximately vertical guides in which are slidably mounted supporting members for the reaping mechanism and transverse conveyer frame which are adapted to be raised and lowered in a straight line by rack and pinion or like gear. The comb and knife are arranged on the front of the frame supporting the transverse conveyers which are adapted to deliver the severed heads of crop from the comb to a longitudinally disposed flexible conveyer the frame of which is formed of two hingedly connected parts the front end being pivoted to the conveyer frame and has its rear end slidably connected to the forward end of an elevator leading to the thresher. Means are provided for resiliently supporting the steering wheels and for effecting the adjustment and operation of the various parts of the machine to suit altered conditions as for instance by the substitution of motor for animal tractive power.

In order that the invention may be readily understood reference will now be had to the accompanying sheets of explanatory drawings wherein Figure 1 is a view in plan of a reaper thresher machine embodying the improvements comprised in the present invention, parts being removed for convenience of illustration.

Fig. 2 is a view in side elevation of the reaper thresher machine shown in Fig. 1, the threshing and winnowing mechanism being shown in position thereon.

Fig. 3 is a view in sectional elevation of Fig. 2 taken on the dotted line 3—3.

Fig. 4 is a view in rear elevation of Fig. 2.

Fig. 5 is a view in sectional front elevation of part of the reaper thresher machine taken on the dotted line 5—5 of Fig. 2 and drawn to a larger scale than the previous figures of the drawings.

Figure 6:
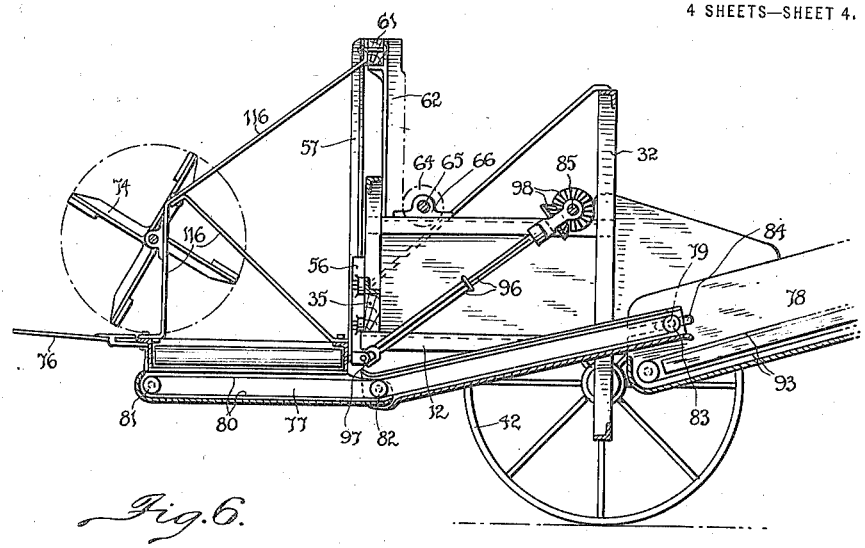
Fig. 6 is a view in sectional side elevation of the front part of the reaper thresher machine taken on the dotted line 6—6 Fig. 5.
Figure 7:
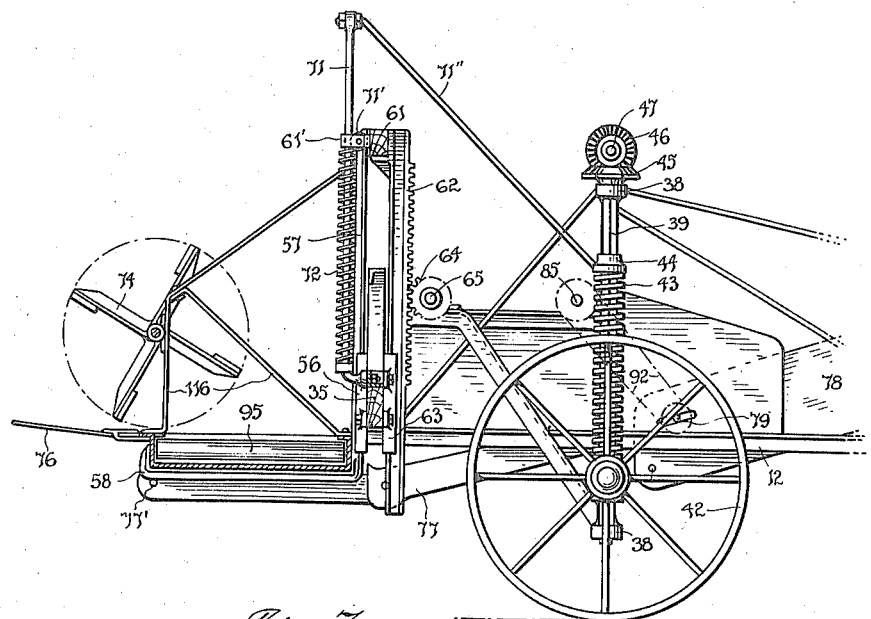
Fig. 7 is a view in sectional side elevation of the front part of the reaper thresher taken on the dotted line 7—7 of Fig. 5.

In these drawings the numeral 10 designates a frame with a broad rear part 11 and a broad front part 12 and a centrally disposed narrow part 13. The rear part 11 is mounted on a transversely disposed fixed axle 14 which is furnished with tractor wheels 15 for fitted with crown or sprocket wheels 16 for imparting motion to a transversely disposed driving shaft 17 through a chain 18 and sprocket 19 or other gearing. The driving shaft 17 is adapted to transmit motion to a counter shaft 20 through chain and sprocket gears 21 and the counter shaft is fitted with a belt pulley 22 and gearing for imparting motion to the shaft of the thresher 23 and to the mechanism of the winnower 24 which are mounted centrally above the rear part of the frame.

The thresher 23, winnower 24 and fan 25 can be arranged in any approved way but preferably as shown in Figs. 2 and 4 of the drawings. The bottom of the winnower inclines downward toward and is adapted to direct the clean grain into a boot 26 at the rear thereof and from the said boot the clean grain is elevated by two oppositely inclined elevators 27 to grain boxes 27' located over the tractor wheels 15, see Fig. 4 of the drawings. This arrangement of the elevating mechanism and boxes for the clean grain effects considerable economy in manufacture and is found very efficient in practice.

The rear part 11 of the frame 10 is rectangular in form and the side members 28 thereof may be located on the outside and the front and rear members 29 and 30, respectively, are located in advance and at the rear of the tractor wheels 15.

The frame is provided with two parallel beams 31 which are arranged longitudinally and extend from the rear end to a point beyond the front beam 32 supporting the front wheels. The central beams 31 are set comparatively close to each other and are connected by diagonal and transverse stays or braces (not shown) to give rigidity to the structure. The forward beam 29 of the rectangular rear part of the frame on both sides of the central beams 31 is provided with swingle-trees 33 for the attachment of the draft gear 34 for the animals employed to haul the machine. The front end of the central beams 31 are fitted to beams 35 which project laterally therefrom and these lateral beams are braced from the said central beams by diagonal beams 36 which are fitted to and serve also to brace the front axle beam 32.

The front axle beam 32 is made in the form of an open frame having two horizontal members 37 one of which passes beneath the central and diagonal beams 31 and 36 respectively, and the other above the said beams.

The ends of the frame forming the front axle beam 32 are fitted with jaw shaped brackets 38 which are adapted to pivotally support vertical posts 39 having blocks or sleeves 40 mounted slidably but non-rotatably thereon and carrying axle-arms 41 for the steering wheels 42.

The blocks or sleeves 40 are located between the brackets 38 and strong spiral compression springs 43 or springs of other approved design are arranged to bear downwardly upon the said blocks or sleeves. The springs 43 encircle the vertical posts 39 and their upper ends are arranged to bear against collars 44 on the said posts and their lower ends against the said blocks or sleeves 40, see Fig. 3 of the drawings.

The object in providing resilient suspension means for the steering wheels 42 is to obviate or minimize the transmission of shock to the frame of the machine incident to the said wheels passing over rough or uneven ground.

The tops of the posts are fitted with bevel pinions or toothed segments 45 which gear with bevel pinions 46 on the outer ends of transverse shafts 47 mounted in brackets 48 secured to the top member of the axle beam 32.

The inner ends of the transverse shafts 47 are fitted with bevel gear wheels 49 adapted to mesh with a bevel gear wheel 49' fitted to the end of a steering rod or column 50 having its opposite end fitted with a hand wheel 51 located near the driver's seat 52 which is mounted on suitable supporting means 52' secured to the frame 10. By operating the hand wheel 51 the driver can direct the course of the machine as required.

A cross head or transversely disposed beam 53 is located above and is secured to uprights 54 fitted to the laterally disposed beams 35 and this cross head or beam 53 bridges the space between and connects the inner ends of the laterally disposed beams 35.

The front of each of the laterally disposed beams 35 is fitted with vertical guides 56 in which are slidably supported the vertical arms of L shaped brackets 57 which support on their horizontal arms 58 the frame 59 of the lateral conveyers 60.

The upper ends of the vertical arms of the L shaped brackets 57 are fitted to a transverse bar or beam 61 and fitted to and depending from the back of the said bar or beam are vertical racks 62 which are slidably mounted in guides 63 fitted to the rear of the laterally disposed beams 35.

A pinion 64 meshes with each rack 62 and the said pinions are fitted to a transverse shaft 65 carried in brackets 66 fitted to the cross-head 53 or to the main frame. A sprocket wheel 67 is fitted to the transverse shaft 65 and this wheel is connected by a chain 68 to a sprocket 69 fitted to a rotatable hand wheel 70 located near the driver's seat. By operating the hand wheel 70 the operator can impart motion to the shaft 65 in the direction required to either raise or lower the racks and consequently the attached conveyer frame 59.

The transverse bar or beam 61 is arranged to slide on vertical guide rods 71 fitted to the laterally disposed beam 35 and the said guide rods are fitted with compensating springs 72 which are adapted to exert an upward pressure on the said bar or beam 61 to facilitate the raising of the conveyer frame 59.

The guide rods preferably are passed through brackets 61' on the transversely disposed beam 61 and to facilitate freedom of movement when raising and lowering the frame 59 the said brackets are provided with rollers 71' adapted to bear against the said guide rods.

The guide rods 71 can be supported rigidly in position by stays 71" which are attached to the main frame.

The conveyer frame 59 is provided with endless aprons 60 upon which a reel or reels 74 is or are adapted to brush the heads of crop and straw cut by a knife 75 at the base of a comb 76 which is fitted to the front of the said frame in the ordinary way.

The endless conveyer aprons 60 are adapted to deliver the severed heads of crop and straw to the front end of a centrally disposed longitudinal conveyer 77 which in turn delivers on to a long longitudinally disposed elevator 78 designed to convey the said heads and straw to the thresher 23 located at the rear of the machine or to a bin when the same is substituted for the threshing and winnowing mechanism.

In order to permit of the longitudinal conveyer 77 adapting itself to the altered positions of the comb when the same is raised and lowered to accommodate crops of different heights the frame thereof is made adjustable by forming it in two hingedly connected parts, the forward end being pivoted at 77' to the underside of the frame 59 and the rear end to the forward part of the elevator as shown at 79, see Fig. 6 of the drawings.

The conveyer 77 is provided with an endless apron 80 which is carried on rollers 81, 82 and 83 mounted in the sides of the frame of the said conveyer. The spindles of the roller 83 at the rear end of the conveyer pass through slots 84 in the sides of the elevator 78 which permit of the said conveyer automatically adjusting itself when the reaping mechanism is being raised and lowered to suit different heights of crop being harvested. The projecting spindles at the ends of the center or guide roller 82 form pivot pins for the pivot or hinge joint between the two parts of the said frame and this hinge joint permits of any movement desired without affecting the conveying capacity of the apron 80.

The conveying aprons 60 and 80 are driven by gearing from a shaft 85 mounted on the forward part of the main frame 10 and adapted to receive its motion from a shaft 86 disposed at the rear of the conveyer frame 59 which is driven by bevel gearing 87 and a shaft 88 from the driving shaft 17 when the machine is in motion.

The shaft 85 is fitted with a sprocket wheel 89 which is connected by a chain 90 to a like wheel 91 fitted to the shaft 86, and chain and sprocket gearing 92 operatively connecting the shaft 85 and roller 83 is employed to transmit motion to the apron 80. The apron 93 of the elevator 78 is driven by chain and sprocket gearing 94 from the driving shaft 17.

The endless aprons 60 of the transverse conveyers are mounted on rollers 95 carried in the frame 59 and the rollers at the inner ends of the said aprons are driven by telescope shafts 96 having universal joints 97 and bevel gearing 98 operated from the shaft 85. The telescopic shafts 96 and universal joints 97 permit of the gearing adjusting itself when the reaping mechanism is raised and lowered to suit crops of different heights.

The near side end of the shaft 86 is fitted with a bevel pinion 99 which gears with a like pinion 100 fitted to a spindle 101 mounted in a bracket 102 on the outer end of the beam 35 on that side of the machine. The spindle 101 is connected by universal joints 103 and a telescopic shaft 103′ to a spindle 104 mounted in bearings 105 fitted to the end of the conveyer frame 59. The spindle 104 is fitted with a disk 106 which is provided with a crank pin 107 connected by a pitman 108 to and adapted to operate the knife bar 109.

The comb 76 can be of any approved design and the knife can be formed in one or two parts and operated by means of a crank or cranks from one or both ends.

The shaft 86 is fitted with a pinion 110 which gears with a like pinion 111 carried on a spindle 112 supported by the bracket 102 and having a sprocket 113 fitted thereto. The reel 74 is operated by a chain 114 and sprocket 115 from the sprocket 113 and the shaft of the said reel is supported by brackets 116 arranged as shown or in any other approved way.

The sprockets 19 are slidably mounted on the driving shaft 17 and are formed with clutch faces which are adapted to engage with spring actuated clutch members 117 slidably mounted on the said shaft. The clutch members 117 can be placed in their clutched and declutched positions at will by means of an operating lever and connections (not shown) arranged in any well known way. The clutch faces besides permitting the driving wheels to run free when the machine is being backed also insure the driving shaft 17 being operated evenly when the said driving wheels are rotating at different speeds.

The operative mechanism may be driven by means of a motor 118 arranged as shown in Fig. 4 and adapted to impart motion to the counter shaft 20 by means of belt and pulley gearing 119. When the operative mechanism of the reaper harvester is driven direct from the motor 118 the connections between the driving wheels and the shaft 17 are dispensed with and the draft animals have the weight of the machine only to move and consequently less draft power is required.

If preferred the motor 118 can be made sufficiently powerful to perform the dual function of operating the mechanisms of the harvester and provide the necessary tractive power. The motor drives on to the counter shaft 20 through the chain and sprocket gearings 21 to the driving shaft 17 and the rear wheels 15 are driven from the driving shaft 17 through the sprockets 19; chains 18 and sprocket 16. In order to permit of the chain and sprocket gearings 21 operating correctly when the tractor wheels are rotating at different speeds as when rounding a curve the sprockets on the driving shaft 17 are provided with spring actuated clutch members 120 which act precisely in the same way as the clutch members 117 engaging with the sprockets 19.

When the machine is actuated entirely by means of a motor the frame 10 may be modified in design to suit requirements.

In a modification of the invention the threshing and winnowing mechanism is substituted by a fixed or removable bin (not shown) arranged to receive the heads of grain taken in by the reaping mechanism and the said heads of grain can be delivered to any desired point and subsequently threshed by any suitable threshing machine in the ordinary way.

We claim:

1. A reaper thresher machine including in combination a main frame, a reaper frame slidably supported on the front of the main frame and provided with reaping and conveying mechanism, vertically disposed guide rods having their lower ends rigidly connected to the main frame and their upper portions slidably engaged by parts of the reaper frame and coiled compensating springs arranged about the guide rods and having their upper ends exerting a constant upward pressure on the parts of the reaper frame engaged with the rods.

2. A reaper thresher machine including in combination, a main frame, a reaper frame slidably mounted at the front of the main frame, transverse conveyers on the reaper frame, an elevator conveyer on the main frame, a sectional longitudinally disposed conveyer arranged beneath the adjacent spaced ends of the transverse conveyers and having the forward end pivoted to the reaper frame and the rear end slidably and pivotally connected with the elevator conveyer.

3. A reaper thresher machine including in combination a main frame, transversely disposed reaper frame slidably mounted on the front of the main frame, transversely disposed conveyer aprons on the reaper frame, an elevator mounted on the main frame, a longitudinally disposed conveyer located beneath the inner ends of the transverse conveyer aprons and including a sectional frame, rollers in the frame, an apron mounted on the rollers, a pivotal connection between the front end of the sectional frame and reaper frame, and a pivotal and slidable connection between the rear end of the sectional frame and the forward end of the elevator.

4. In a reaper thresher machine the combination of a main frame having reaping mechanism located transversely in advance thereof, of a comb and reaping knife on the front of the frame of the reaping mechanism, a pair of transversely disposed conveyer aprons on the reaper frame for conveying the heads of grain severed by the knife toward the center of the machine, an elevator mounted in the main frame, a longitudinal conveyer apron located beneath and receiving the heads of grain from the transverse conveyers, a sectional frame for the longitudinal conveyer formed of hingedly connected parts, a pivotal connection between the front end of the front part of the longitudinal conveyer and the frame of the reaping mechanism, and a slidable and pivotal connection between the rear end of the rear part of the conveyer frame and the elevator.

5. In a reaper thresher machine the combination with a main frame of reaping mechanism disposed transversely on the front of the main frame and comprising a transverse frame, a comb and reaping knife on the front of the transverse frame, a pair of transversely disposed conveyer aprons on the transverse frame, an elevator mounted in the main frame, a longitudinally disposed conveyer apron having its front end located beneath the inner ends of the transverse aprons, a frame for the longitudinal conveyer formed of two hingedly connected parts, end rollers and a guide roller for the apron of the longitudinal conveyer, a pivotal connection between the front end of the longitudinal conveyer frame and the transverse frame, a slidable and pivotal connection between the rear end of the frame of the longitudinal conveyer and the lower end of the elevator, and means for imparting motion to the aprons of the transverse and longitudinal conveyers.

6. A reaper thresher machine as claimed in claim 6 wherein a shaft is disposed transversely on the front of the main frame and adapted to be driven from a driving shaft, gearing for transmitting motion from the transverse shaft to an eccentric for operating the reaping knife, gearing for transmitting motion from the transverse shaft to a second shaft arranged in parallelism therewith and gearing for transmitting motion from the second shaft to the rollers supporting the inner ends of the transverse conveyer aprons.

7. In a reaper thresher machine the combination with a main frame of a transversely disposed reaper frame, a comb and reaping knife on the front of the reaper frame, a plurality of vertically disposed rigid members on the rear portion of the reaper frame, guides on the front of the main frame engaging the vertical members, a transversely disposed bar connecting the upper ends of the vertical members, racks fitted vertically to the back of the reaper frame and to the connecting bar, a shaft on the main frame, and pinions fitted to the shaft on the main frame and operatively engaging the racks.

8. In a reaper thresher machine the combination with a main frame having a reaper frame located transversely in advance thereof and provided with reaping and conveying members, of guides on the front of the main frame adapted to slidably support the reaper frame, rack and pinion gear for raising and lowering the reaper frame with respect to the main frame, guide rods on the main frame slidably engaged by portion of the reaper frame, and coiled springs arranged about the rods and exerting an upward pressure on the portion of the reaper frame which engages the rods to facilitate the raising of the reaper frame.

In testimony whereof we have affixed our signatures in the presence of two witnesses.

GILBERT MAW BARBY.
ARTHUR WILLIAM BARBY.

Witnesses:
LUCY M. GREEN,
G. L. CULLEN.